United States Patent
Cho et al.

(10) Patent No.: US 6,873,739 B2
(45) Date of Patent: Mar. 29, 2005

(54) IMAGE COMPRESSION/DECODING APPARATUS AND METHOD

(75) Inventors: Kyeongsoon Cho, Gyeonggi-do (KR); Seogil Hong, Gyeonggi-do (KR); Seonyoung Lee, Seoul (KR)

(73) Assignee: ECT, Inc., Seoul (KR)

( * ) Notice: Subject to any disclaimer, the term of this patent is extended or adjusted under 35 U.S.C. 154(b) by 659 days.

(21) Appl. No.: 09/855,864

(22) Filed: May 14, 2001

(65) Prior Publication Data

US 2002/0031275 A1 Mar. 14, 2002

(30) Foreign Application Priority Data

May 15, 2000 (KR) ........................................ 2000-25710

(51) Int. Cl.[7] .............................................. G06K 9/36
(52) U.S. Cl. ................... 382/240; 382/233; 375/240.11
(58) Field of Search ............................... 382/240, 248, 382/233; 375/240.11

(56) References Cited

U.S. PATENT DOCUMENTS 6,031,940 A * 2/2000 Chui et al. ................... 382/240
6,141,446 A * 10/2000 Boliek et al. ................ 382/233
6,661,842 B1 * 12/2003 Abousleman .......... 375/240.11

FOREIGN PATENT DOCUMENTS

EP 0926896 A2 * 6/1999 ............ H04N/7/26

OTHER PUBLICATIONS

Mihcak et al., "Low–Complexity Image Denoising Based on Statistical Modeling of Wavelet coefficients", IEEE, Signal Processing Letter, vol. 6, No. 12, Dec. 1999, pps. 300–303.*

* cited by examiner

Primary Examiner—Anh Hong Do
(74) Attorney, Agent, or Firm—Park & Sutton LLP; John K. Park

(57) ABSTRACT

An image compression apparatus is provided, which includes a wavelet transformer, a quantizer, a comparator, a subtracter, a low data compressor and a high data compressor. The comparator compares the first quantization coefficients of the first quantization data, to output the maximum quantization coefficient. The subtracter subtracts the minimum quantization coefficient from the maximum quantization coefficient, to output a subtraction constant. The low data compressor subtracts the subtraction constant from the first quantization coefficients, to output low compression data obtained by compressing the first quantization data. The high data compressor sequentially generates first compression data obtained by coding the number of zero quantization coefficients each having at least one successive zero value among the second quantization coefficients, and second compression data obtained by coding the second quantization coefficients other than the zero quantization coefficients according to a coding rule, to output high compression data.

18 Claims, 8 Drawing Sheets

FIG.9

| MSBG | LSBG | QUAN2 | QUAN2 | MSBG | LSBG |
|---|---|---|---|---|---|
| 11 | 0 | −1 | +1 | 11 | 1 |
| 101 | 0 | −2 | +2 | 101 | 1 |
| 1001 | 00 | −3 | +3 | 1001 | 01 |
| | 10 | −4 | +4 | | 11 |
| 10001 | 000 | −5 | +5 | 10001 | 001 |
| | 010 | −6 | +6 | | 011 |
| | 100 | −7 | +7 | | 101 |
| | 110 | −8 | +8 | | 111 |
| 100001 | 0000 | −9 | +9 | 100001 | 0001 |
| | 0010 | −10 | +10 | | 0011 |
| | ~ | ~ | ~ | | ~ |
| | 1100 | −15 | +15 | | 1101 |
| | 1110 | −16 | +16 | | 1111 |
| 1000001 | 00000 | −17 | +17 | 1000001 | 00001 |
| | 00010 | −18 | +18 | | 00011 |
| | ~ | ~ | ~ | | ~ |
| | 11100 | −31 | +31 | | 11101 |
| | 11110 | −32 | +32 | | 11111 |
| 10000001 | 000000 | −33 | +33 | 10000001 | 000001 |
| | 000010 | −34 | +34 | | 000011 |
| | ~ | ~ | ~ | | ~ |
| | 111100 | −63 | +63 | | 111101 |
| | 111110 | −64 | +64 | | 111111 |
| 100000001 | 0000000 | −65 | +65 | 100000001 | 0000001 |
| | 0000010 | −66 | +66 | | 0000011 |
| | ~ | ~ | ~ | | ~ |
| | 1111000 | −127 | +127 | | 1111101 |
| | 1111110 | −128 | +128 | | 1111111 |
| 1000000001 | 00000000 | −129 | +129 | 1000000001 | 00000001 |
| | 00000010 | −130 | +130 | | 00000011 |
| | ~ | ~ | ~ | | ~ |
| | 11111100 | −255 | +255 | | 11111101 |

IMAGE COMPRESSION/DECODING APPARATUS AND METHOD

CLAIMING FOREIGN PRIORITY

The applicant claims and requests a foreign priority, through the Paris Convention for the Protection of Industry Property, based on a patent application filed in the Republic of Korea (South Korea) with the filing date of May 15, 2000, with the patent application number 2000-0025710, by the applicant. (See the Attached Declaration)

BACKGROUND OF THE INVENTION

1. Field of the Invention

The present invention relates to an image compression/decoding apparatus and method, and more particularly, to an image compression/decoding apparatus and method for wavelet-transforming and quantizing digital image data and compressing/decoding quantized data.

2. Description of the Related Art

A purpose of compressing digital image data is to reduce a bit rate of an imput image or enhance an efficiency of a storage unit for image data.

There are a block DCT (Discrete Cosine Transform) coding method and a wavelet transform coding method as an image data compression method. The block DCT coding method has problems that a blocking effect and mosquito noise occur. The wavelet transform coding method can overcome the above problems.

FIG. 1 is a block diagram showing a conventional image compression apparatus using wavelet transform.

The conventional image compression apparatus using wavelet transform of FIG. 1 includes a wavelet transformer 1 for wavelet-transforming received digital image data ID, a quantizer 2 for dividing the wavelet transformed data by a bin size and outputting quantization coefficient data having a range between −255 and +255, and a Huffman encoder 3 for compressing the quantization coefficient data by use of a Huffman coding method and outputting compressed data CD.

FIG. 2 is a transform state diagram showing the state of an image divided by wavelet transform in a wavelet transformer 1, in which digital image data is divided once.

As shown in FIG. 2, the wavelet transformer 1 passes digital image data through a vertical low pass filter and a vertical high pass filter, and passes the output of the vertical low pass filter through a horizontal low pass filter and a horizontal high pass filter, to thereby output a first wavelet transformed image LL and a second wavelet transformed image LH. Also, the wavelet transformer 1 passes the output of the vertical high pass filter through the horizontal low pass filter and the horizontal high pass filter, to thereby output a third wavelet transformed image HL and a fourth wavelet transformed image HH.

In addition, the first wavelet transformed image LL can be divided again through the above process. The Huffman encoder 3 forms a Huffman tree according to the number of frequency in quantization coefficient data of each pixel in which data of each pixel in the first through fourth wavelet transformed images LL, LH, HL and HH divided in FIG. 2 is quantized. Accordingly, quantization coefficient data having the highest frequency number is coded into the smallest number of bits, and quantization coefficient data having the lowest frequency number is coded into the largest number of bits, to thereby output final compressed data.

The image data compression apparatus for compressing digital image data by using a conventional Huffman encoder uses hardware and software to form a Huffman tree with respect to all quantization coefficient data obtained by quantizing each wavelet transformed image, to thereby perform a Huffman coding. Accordingly, the amount of calculation increases and it takes much time to perform the Huffman coding. Also, a circuit for embodying the digital image data compression apparatus becomes complicated.

Also, although quantization coefficient data obtained by quantizing the first wavelet transformed image LL of a low frequency region in the quantizer 2 is distributed in various forms and quantization coefficient data of a high frequency region other than the first wavelet transformed image LL region is often distributed with the small number of quantization coefficient data, the conventional image data compression apparatus performs the Huffman coding identically with respect to all the quantization coefficient data irrespective of the various and particular distribution of the quantization coefficient data. As a result, inefficient data compression may be caused and a memory device having a large storage capacity should be used in order to store compressed data.

SUMMARY OF THE INVENTION

To solve the above problems, it is an object of the present invention to provide an image compression/decoding apparatus and method for compressing image data efficiently and minimizing a memory capacity for storing the compressed data, in which digital image data is divided into first quantization coefficient data of a region having the lowest frequency and second quantization coefficient data other than the lowest frequency region, by wavelet transformation and quantization, and the first and second quantization coefficient data is compressed by a different method with respect to each other.

It is another object of the present invention to provide an image compression/decoding apparatus and method having no need to embody a Huffman tree, to thereby minimize a calculation amount and simplify a circuit for embodying the image compression/decoding apparatus, in which a coding rule is prepared in advance with respect to quantization coefficient data having the highest frequency number from that having the lowest frequency number among quantization coefficient data, and quantization coefficient data is coded by the coding rule.

To accomplish the above object of the present invention, there is provided an image compression apparatus comprising: a wavelet transformer which receives digital image data, wavelet-transforms the digital image data in at least one step, and divides the digital image data into a first wavelet region having the lowest frequency and a second wavelet region having the other frequency, to thereby output image data of the first wavelet region and image data of the second wavelet region; a quantizer which receives both the image data of the first and second wavelet regions and respectively quantizes the image data of the first and second wavelet regions to thereby output first quantization data formed of first quantization coefficients and second quantization data formed of second quantization coefficients, respectively; a comparator which receives the first quantization data and compares the first quantization coefficients of the first quantization data, to thereby output the maximum quantization coefficient having the maximum quantization coefficient value and the minimum quantization coefficient having the minimum quantization coefficient value, among the first quantization coefficients; a subtracter which receives the maximum quantization coefficient and the minimum quantization coefficient output from the comparator and subtracts the latter from the former, to thereby output a subtraction constant; a low data compressor which receives the first quantization data and the subtraction constant and subtracts the subtraction constant from the first quantization coefficients of the first quantization data, to thereby output low compression data obtained by compressing the first quantization data; and a high data compressor which sequentially receives the second quantization coefficients of the second quantization data and sequentially generates first compression data obtained by coding the number of zero quantization coefficients each having at least one successive zero value among the second quantization coefficients, and second compression data obtained by coding the second quantization coefficients other than the zero quantization coefficients according to a coding rule with reference to the coding rule where compression codes are established according to a respective quantization coefficient, to thereby output high compression data.

According to another aspect of the present invention, there is also provided an image compression method comprising: a wavelet transformation process which receives digital image data, wavelet-transforms the digital image data in at least one step, and divides the digital image data into a first wavelet region having the lowest frequency and a second wavelet region having the other frequency; a quantization process which quantizes the image data of the first wavelet region and the image data of the second wavelet region to thereby generate first quantization data formed of first quantization coefficients and second quantization data formed of second quantization coefficients, respectively; a quantization data judgement process which receives the first and second quantization data generated in the quantization process, and judges whether currently received quantization data is the first quantization data or the second quantization data; a comparison process which compares the first quantization coefficients of the first quantization data, if it is judged that the currently received quantization data is the first quantization data in the quantization data judgement process, to thereby output the maximum quantization coefficient having the maximum quantization coefficient value and the minimum quantization coefficient having the minimum quantization coefficient value, among the first quantization coefficients; a subtraction process which subtracts the minimum quantization coefficient from the maximum quantization coefficient, which are generated in the comparison process, to thereby output a subtraction constant; a low data compression process which subtracts the subtraction constant from the first quantization coefficients of the first quantization data, to thereby output low compression data obtained by compressing the first quantization data; and a high data compression process which codes the number of zero quantization coefficients each having at least one successive zero value among the sequentially input second quantization coefficients, if the received quantization data is the second quantization data in the quantization data judgment process, and codes the second quantization coefficients other than the zero quantization coefficients according to a coding rule with reference to the coding rule where compression codes are established according to a respective quantization coefficient, to thereby output high compression data.

According to still another aspect of the present invention, there is also provided an image decoding apparatus comprising: a first judgment unit which receives image compression data and judges whether the received image compression data is low compression data or high compression data, to thereby output the low compression data and the high compression data; an adder which receives the low compression data of the first judgment unit and adds a subtraction constant to the received low compression data and transforms the received low compression data into first quantization data; a second judgment unit which receives the high compression data of the first judgment unit and judges whether the received high compression data is first compression data or second compression data, to thereby output the first and second compression data; a first decoder which receives the first compression data of the second judgment unit and outputs zero quantization coefficients each having a zero value; a second decoder which receives the second compression data of the second judgment unit and outputs second quantization data according to a coding rule with reference to the coding rule where quantization coefficients are established depending upon compression codes; an inverse quantizer which receives the first quantization data, the zero quantization data and the second quantization data, inversely quantizes the first quantization data to then output first wavelet region image data having the lowest frequency, inversely quantizes the zero quantization data and the second quantization data to then second wavelet region image data having frequencies other than the lowest frequency; and an inverse wavelet transformer which receives the first wavelet region image data and the second wavelet region image data and inversely wavelet-transforms the received first and second wavelet region image data, to thereby output decoded digital image data.

According to yet another aspect of the present invention, there is also provided an image decoding method comprising: a first judgment process of receiving image compression data and judges whether the received image compression data is low compression data or high compression data; an adding process of adding a subtraction constant to the low compression data of the first judgment process and transforming the low compression data into first quantization data; a second judgment process of judging whether the high compression data of the first judgment process is first compression data or second compression data; a first decoding process of receiving the first compression data of the second judgment process and outputting zero quantization data each having a zero value; a second decoding process of receiving the second compression data of the second judgment process and outputting second quantization data according to a coding rule with reference to the coding rule where quantization coefficients are established depending upon compression codes; an inverse quantization process of receiving the first quantization data, the zero quantization data and the second quantization data, inversely quantizing the first quantization data to then output first wavelet region image data having the lowest frequency, inversely quantizing the zero quantization data and the second quantization data to then second wavelet region image data having frequencies other than the lowest frequency; and an inverse wavelet transformation process of receiving the first wavelet region image data and the second wavelet region image data and inversely wavelet-transforming the received first and second wavelet region image data, to thereby output decoded digital image data.

BRIEF DESCRIPTION OF THE DRAWINGS

The above objects and other advantages of the present invention will become more apparent by describing the preferred embodiment thereof in more detail with reference to the accompanying drawings in which:

FIG. 9 shows a coding rule for image compression and image decoding according to the present invention.

DETAILED DESCRIPTION OF THE INVENTION

An image compression/decoding apparatus and method according to the present invention will be described below in more detail with reference to the accompanying drawings.

Figure 3:
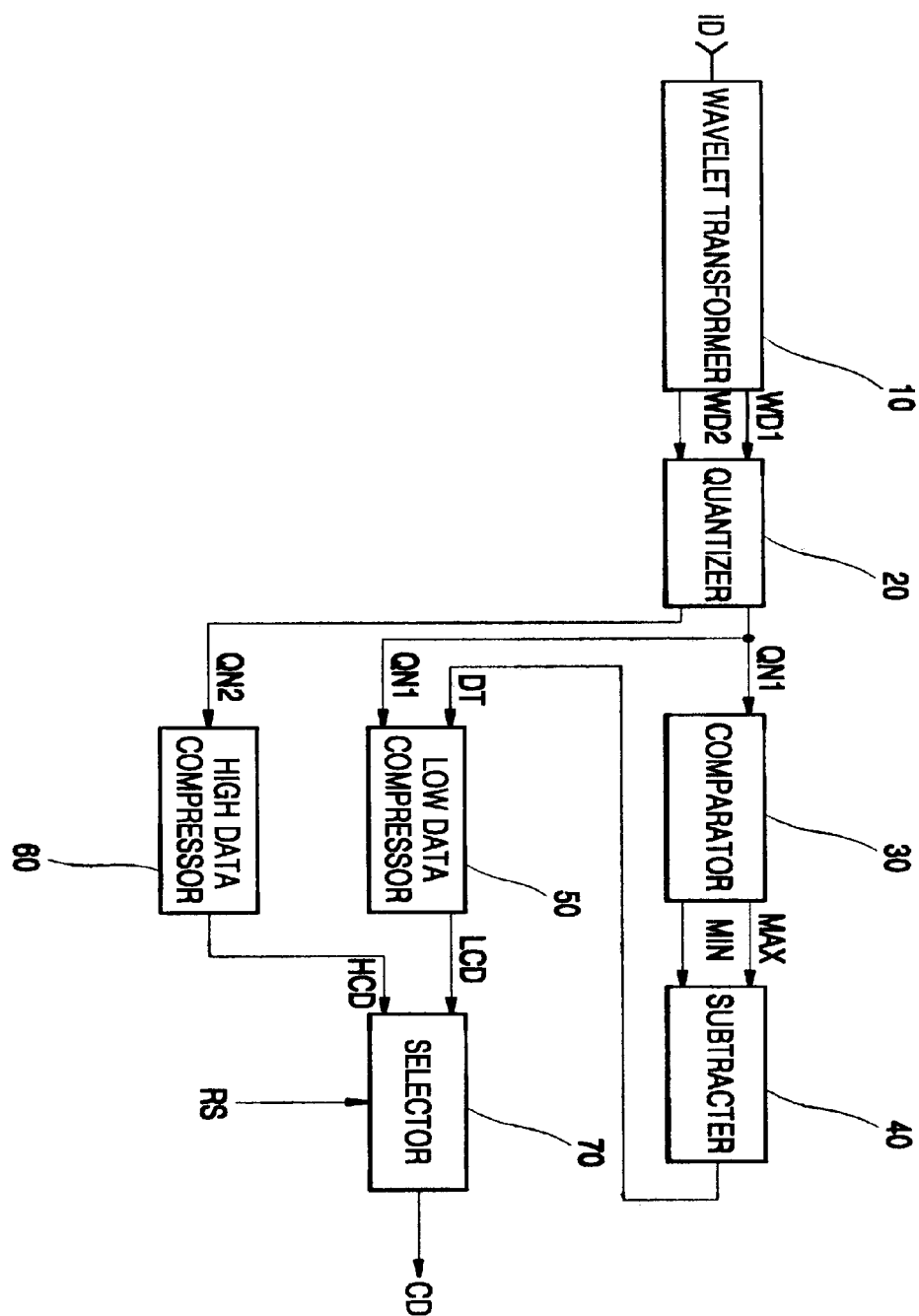
FIG. 3 is a block diagram showing an image compression apparatus according to the present invention.

FIG. 3 is a block diagram showing an image compression apparatus according to the present invention.

In FIG. 3, an image compression apparatus includes a wavelet transformer 10, a quantizer 20, a comparator 30, a subtracter 40, a low data compressor 50 and a high data compressor 60. The wavelet transformer 10 receives digital image data (ID), wavelet-transforms the digital image data (ID) in at least one step, and divides the digital image data (ID) into a first wavelet region having the lowest frequency and a second wavelet region having the other frequency, to thereby output image data WD1 of the first wavelet region and image data WD2 of the second wavelet region. The quantizer 20 receives both the image data WD1 and WD2 of the first and second wavelet regions and respectively quantizes the image data WD1 and WD2 of the first and second wavelet regions to thereby output first quantization data QN1 formed of first quantization coefficients and second quantization data QN2 formed of second quantization coefficients, respectively. The comparator 30 receives the first quantization data QN1 and compares the first quantization coefficients of the first quantization data QN1, to thereby output the maximum quantization coefficient MAX having the maximum quantization coefficient value and the minimum quantization coefficient MIN having the minimum quantization coefficient value, among the first quantization coefficients. The subtracter 40 receives the maximum quantization coefficient and the minimum quantization coefficient output from the comparator and subtracts the latter from the former, to thereby output a subtraction constant DT. The low data compressor 50 receives the first quantization data QN1 and the subtraction constant DT and subtracts the subtraction constant from the first quantization coefficients QUAN1 of the first quantization data QN1, to thereby output low compression data LCD obtained by compressing the first quantization data QN1. The high data compressor 60 sequentially receives the second quantization coefficients QUAN2 of the second quantization data QN2 and sequentially generates first compression data obtained by coding the number of zero quantization coefficients each having at least one successive zero value among the second quantization coefficients QUAN2, and second compression data obtained by coding the second quantization coefficients other than the zero quantization coefficients according to a coding rule with reference to the coding rule where compression codes are established according to a respective quantization coefficient, to thereby output high compression data HCD.

The image data compression apparatus further includes a selector 70 which receives a region select signal RS for distinguishing the first wavelet region from the second wavelet region, the low compression data LCD and the high compression data HCD and selects one of the low compression data LCD and the high compression data HCD according to the region select signal RS, to thereby output image compression data CD.

The first compression data is obtained by counting the number of zero quantization coefficients each having at least one successive zero value among the second quantization coefficients QUAN2 and coding the successive zero quantization coefficients into the counted result.

Also, in the case of the first compression data, the counted binary number data is inversely transformed from the uppermost bit to the lowermost bit. The inversely transformed data is divided into two bits by two bits and zero of a binary number is inserted every two bits. Also, zero of a binary number is inserted in front of the uppermost bit of the inversely transformed data, and zero of a binary number is not inserted in the next of the lowermost bit of the inversely transformed data.

FIG. 9 shows a coding rule for image compression and image decoding according to the present invention. As shown in FIG. 9, a coding rule contains coding data which is comprised of an upper bit group MSBG including a number of bits and a lower bit group LSBG including a number of bits, depending upon the second quantization coefficients QUAN2. If an absolute value of the second quantization coefficient QUAN2 is one, first coding data of the upper bit group MSBG is 11 of a binary number. As the absolute value of the second quantization coefficient QUAN2 increases, zero of a binary number is inserted between 1 of a binary number and 1 of a binary number in the first coding data. The number into which zero of the binary number is inserted is the number of significant bits which are obtained by subtracting one of a decimal number from the absolute value of the second quantization coefficient QUAN2 and transforming the subtraction result into a binary number. If a second quantization coefficient QUAN2 is +1, the second coding data of the lower bit group LSBG is one of a binary number. If a second quantization coefficient QUAN2 is −1, the third coding data of the lower bit group LSBG is zero of a binary number. If a quantization coefficient QUAN2 is a positive number and larger than +1, the coding data of the lower bit group LSBG contains bits obtained by transforming a decimal number obtained by $\{$second quantization coefficient$-(2^{(number\ of\ significant\ bits-1)}+1)\}*2+1$ into a binary number. If a quantization coefficient QUAN2 is a negative number and smaller than −1, the coding data of the lower bit group LSBG contains bits obtained by transforming a decimal number obtained by $\{$absolute value of second quantization coefficient$-(2^{(number\ of\ significant\ bits-1)}+1)\}*2$ into a binary number.

Figure 4:
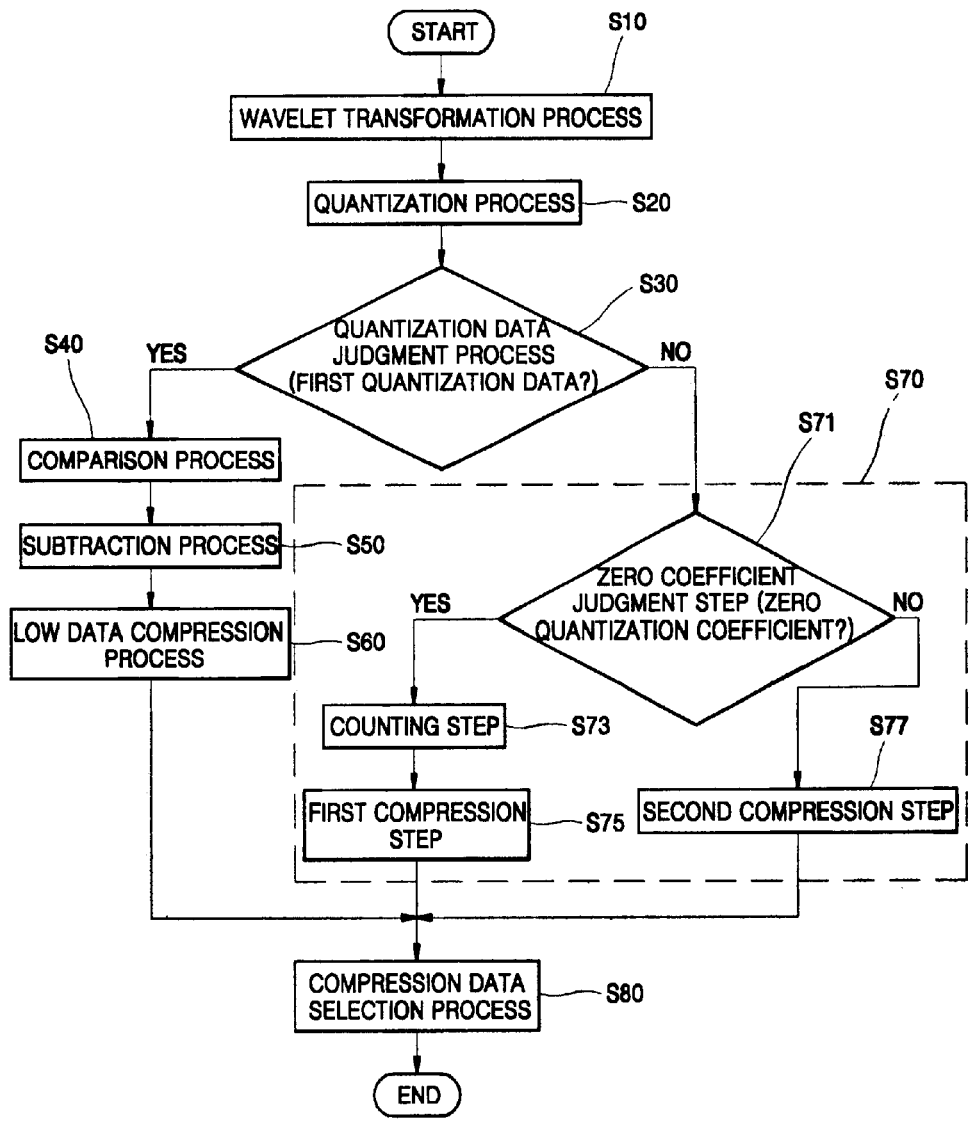
FIG. 4 is a flowchart view illustrating an image compression method according to a first embodiment of the present invention.

FIG. 4 is a flowchart view illustrating an image compression method according to a first embodiment of the present invention.

An image compression method according to a first embodiment of the present invention includes a wavelet transformation process S10, a quantization process S20, a quantization data judgement process S30, a comparison process S40, a subtraction process S50, a low data compression process S60, and a high data compression process S70.

The wavelet transformation process S10 receives digital image data, wavelet-transforms the digital image data in at least one step, and divides the digital image data into a first wavelet region having the lowest frequency and a second wavelet region having the other frequency. The quantization process S20 quantizes the image data of the first wavelet region and the image data of the second wavelet region to thereby generate first quantization data formed of first quantization coefficients and second quantization data formed of second quantization coefficients, respectively. The quantization data judgement process S30 receives the first and second quantization data generated in the quantization process S20, and judges whether currently received quantization data is the first quantization data or the second quantization data. The comparison process S40 compares the first quantization coefficients of the first quantization data, if it is judged that the currently received quantization data is the first quantization data in the quantization data judgement process S30, to thereby output the maximum quantization coefficient having the maximum quantization coefficient value and the minimum quantization coefficient having the minimum quantization coefficient value, among the first quantization coefficients. The subtraction process S50 subtracts the minimum quantization coefficient from the maximum quantization coefficient, which are generated in the comparison process S40, to thereby output a subtraction constant. The low data compression process S60 subtracts the subtraction constant generated in the subtraction process S50 from the first quantization coefficients of the first quantization data, to thereby output low compression data obtained by compressing the first quantization data. The high data compression process S70 codes the number of zero quantization coefficients each having at least one successive zero value among the sequentially input second quantization coefficients, if the received quantization data is the second quantization data in the quantization data judgment process S30, and codes the second quantization coefficients other than the zero quantization coefficients according to a coding rule with reference to the coding rule where compression codes are established according to a respective quantization coefficient, to thereby output high compression data.

Also, the image data compression method of FIG. 4 further includes a selection process S80 which receives a region select signal for distinguishing the first wavelet region from the second wavelet region, the low compression data and the high compression data and selects one of the low compression data and the high compression data according to the region select signal.

The high data compression process S70 includes a zero coefficient judgment step S71, a counting step S73, a first compression step S75 and a second compression step S77. The zero coefficient judgment step S71 judges whether sequentially input second quantization coefficients are zero quantization coefficients each having a zero value. The counting step S73 counts the number of the zero quantization coefficients if the second quantization coefficients are zero quantization coefficients in the zero coefficient judgment step S71. The first compression step S75 codes the counted result of the counting step S73 into data of a binary number to then generate first compression data, and reset the counted number of the counting step S73. The second compression step S77 codes the second quantization coefficients according to a coding rule with reference to the coding rule where compression codes are established according to a respective quantization coefficient if the second quantization coefficients are not the zero quantization coefficients in the zero coefficient judgment step S71 and the number of the quantization coefficients counted in the counting step S73 is zero.

Also, in the case of the first compression data in the first compression step S75, the counted binary number data of the counting step S73 is inversely transformed from the uppermost bit to the lowermost bit. The inversely transformed data is divided into two bits by two bits and zero of a binary number is inserted every two bits. Also, zero of a binary number is inserted in front of the uppermost bit of the inversely transformed data, and zero of a binary number is not inserted in the next of the lowermost bit of the inversely transformed data.

As shown in FIG. 9, a coding rule contains coding data which is comprised of an upper bit group MSBG including a number of bits and a lower bit group LSBG including a number of bits, depending upon the second quantization coefficients QUAN2. If an absolute value of the second quantization coefficient QUAN2 is one, first coding data of the upper bit group MSBG is 11 of a binary number. As the absolute value of the second quantization coefficient QUAN2 increases, zero of a binary number is inserted between 1 of a binary number and 1 of a binary number in the first coding data. The number into which zero of the binary number is inserted is the number of significant bits which are obtained by subtracting one of a decimal number from the absolute value of the second quantization coefficient QUAN2 and transforming the subtraction result into a binary number. If a second quantization coefficient QUAN2 is +1, the second coding data of the lower bit group LSBG is one of a binary number. If a second quantization coefficient QUAN2 is −1, the third coding data of the lower bit group LSBG is zero of a binary number. If a quantization coefficient QUAN2 is a positive number and larger than +1, the coding data of the lower bit group LSBG contains bits obtained by transforming a decimal number obtained by $\{\text{second quantization coefficient} - (2^{(number\ of\ significant\ bits-1)} + 1)\} * 2 + 1$ into a binary number. If a quantization coefficient QUAN2 is a negative number and smaller than −1, the coding data of the lower bit group LSBG contains bits obtained by transforming a decimal number obtained by $\{\text{absolute value of second quantization coefficient} - (2^{(number\ of\ significant\ bits-1)} + 1)\} * 2$ into a binary number.

Figure 5:
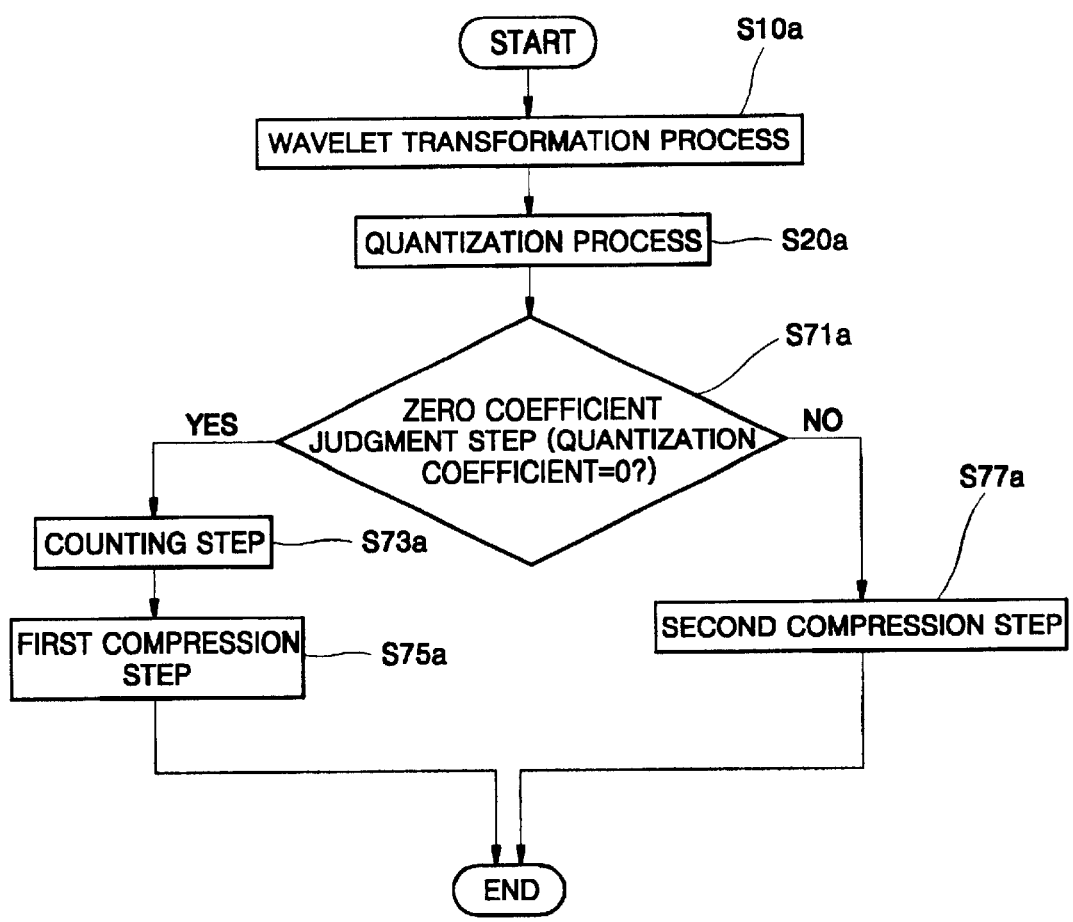
FIG. 5 is a flowchart view illustrating an image compression method according to a second embodiment of the present invention.

FIG. 5 is a flowchart view illustrating an image compression method according to a second embodiment of the present invention.

The image compression method according to a second embodiment of the present invention as shown in FIG. 5 includes a wavelet transformation process S10a, a quantization process S20a, a zero coefficient judgement process S71a, a counting process S73a, a first compression process S75a, and a second compression process S77a.

The wavelet transformation process S10a receives digital image data, and wavelet-transforms the digital image data in at least one step. The quantization process S20a quantizes the wavelet transformed image data to thereby generate quantization data. The zero coefficient judgement process S71a judges whether the quantization coefficients of the sequentially input quantization data are zeros. The counting process S73a counts the number of the zero quantization coefficients if the quantization coefficients are zeros in the zero coefficient judgment process S71a. The first compression process S75a codes the counted result of the counting step S73a into data of a binary number to then generate first compression data, and reset the counted number of the counting process S73a. The second compression process S77a codes the quantization coefficients according to a coding rule with reference to the coding rule where compression codes are established according to a respective quantization coefficient if the quantization coefficients are not zero in the zero coefficient judgment process S71a.

Also, in the case of the first compression data in the first compression process S75a, zero of a binary number is positioned in the uppermost bit, and then the counted number of the counting process S73a is divided into two bits by two bits. Zero of a binary number is inserted every two bits, and zero of a binary number is not inserted in the next of the lowermost two bits of the counted number.

As shown in FIG. 9, a coding rule contains coding data which is comprised of an upper bit group MSBG including a number of bits and a lower bit group LSBG including a number of bits, depending upon the quantization coefficients. If an absolute value of the quantization coefficient is one, first coding data of the upper bit group MSBG is 11 of a binary number. As the absolute value of the quantization coefficient increases, zero of a binary number is inserted between 1 of a binary number and 1 of a binary number in the first coding data. The number into which zero of the binary number is inserted is the number of significant bits which are obtained by subtracting one of a decimal number from the absolute value of the quantization coefficient and transforming the subtraction result into a binary number. If a quantization coefficient is +1, the second coding data of the lower bit group LSBG is one of a binary number. If a quantization coefficient is −1, the third coding data of the lower bit group LSBG is zero of a binary number. If a quantization coefficient is a positive number and larger than +1, the coding data of the lower bit group LSBG contains bits obtained by transforming a decimal number obtained by {second quantization coefficient−($2^{(number\ of\ significant\ bits-1)}$+1)}*2+1 into a binary number. If a quantization coefficient is a negative number and smaller than −1, the coding data of the lower bit group LSBG contains bits obtained by transforming a decimal number obtained by {absolute value of second quantization coefficient−($2^{(number\ of\ significant\ bits-1)}$+1)}*2 into a binary number.

Figure 6:
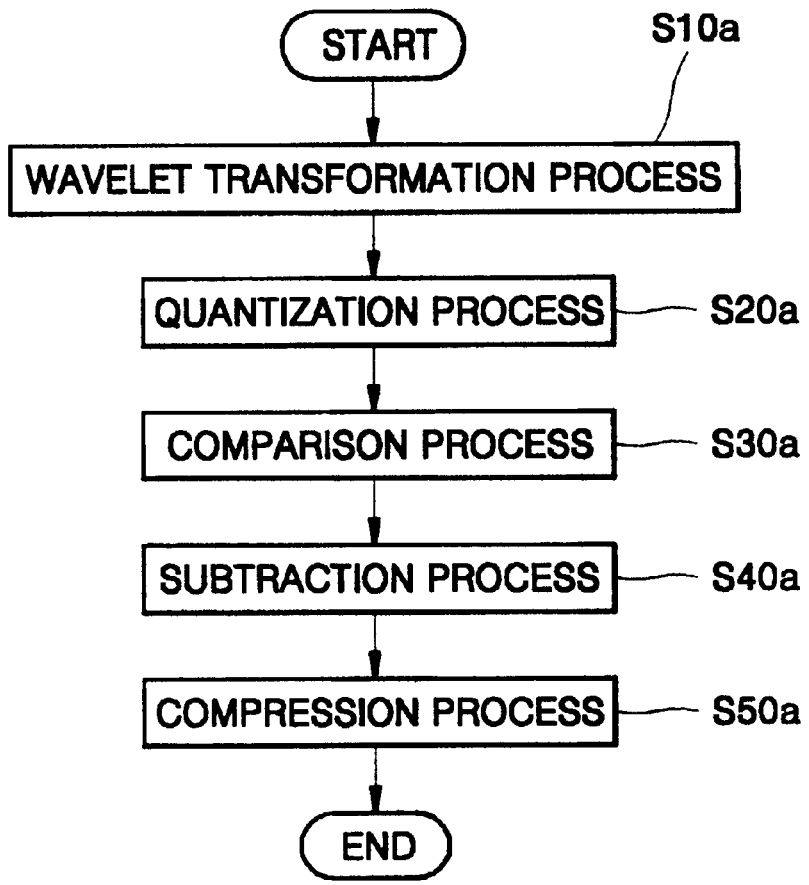
FIG. 6 is a flowchart view illustrating an image compression method according to a third embodiment of the present invention.

FIG. 6 is a flowchart view illustrating an image compression method according to a third embodiment of the present invention.

The image compression method according to a third embodiment of the present invention as shown in FIG. 6 includes a wavelet transformation process S10a, a quantization process S20a, a comparison process S30a, a subtraction process S40a, and a compression process S50a.

The wavelet transformation process S10a receives digital image data, and wavelet-transforms the digital image data in at least one step. The quantization process S20a quantizes the wavelet transformed image data to thereby generate quantization data. The comparison process S30a generates the maximum quantization coefficient having the largest quantization coefficient value and the minimum quantization coefficient having the smallest quantization coefficient value, among the quantization data. The subtraction process S40a subtracts the minimum quantization coefficient from the maximum quantization coefficient generated in the comparison process S30a, to thereby generate a subtraction constant. The compression process S50a subtracts the subtraction constant generated in the subtraction process S40a from each of the quantization coefficients in the quantization data, to thereby compress the quantization data.

Figure 7:
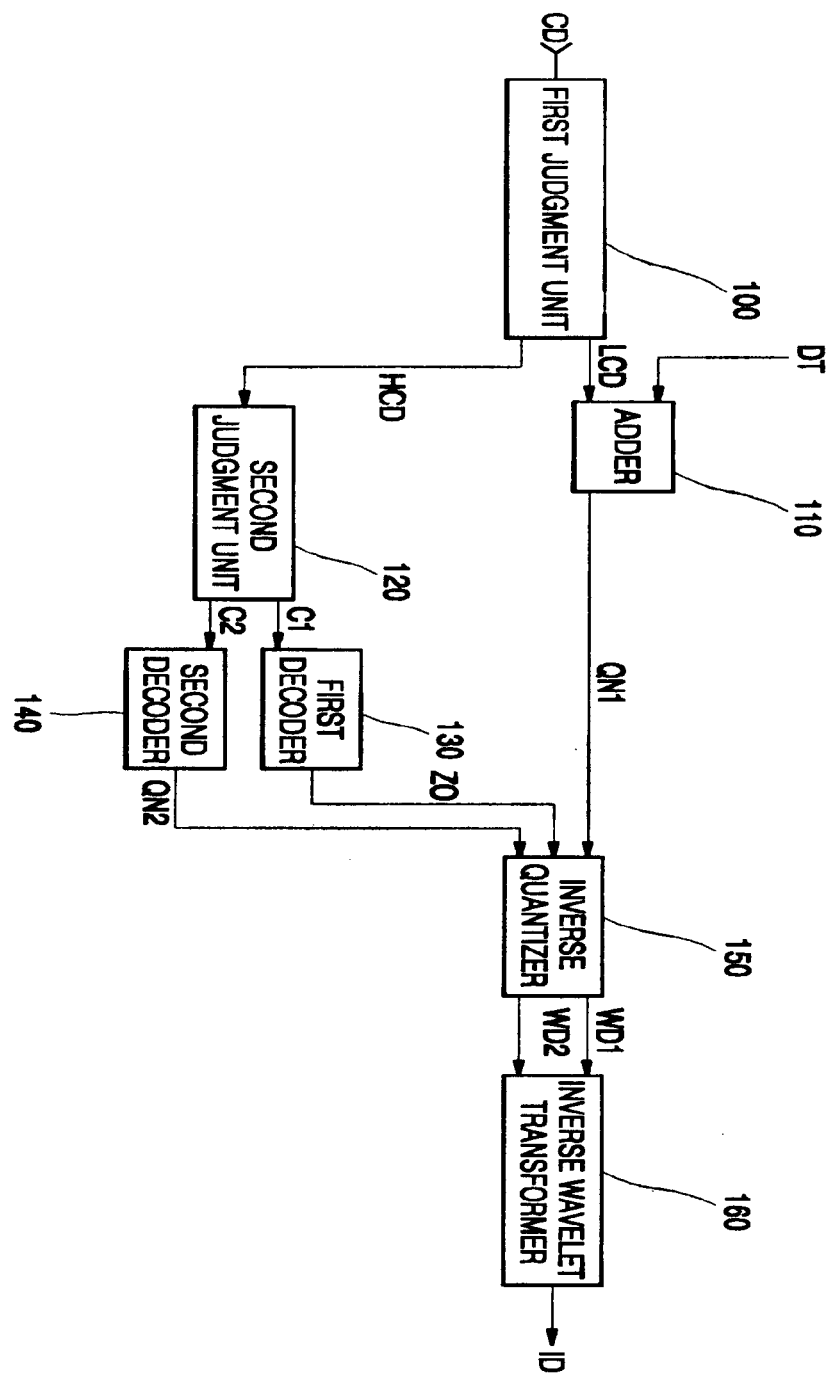
FIG. 7 is a block diagram showing an image decoding apparatus according to the present invention.

FIG. 7 is a block diagram showing an image decoding apparatus according to the present invention.

The image decoding apparatus according the present invention as shown in FIG. 7 includes a first judgment unit 100, an adder 110, a second judgment unit 120, a first decoder 130, a second decoder 140, an inverse quantizer 150, and an inverse wavelet transformer 160.

The first judgment unit 100 receives image compression data and judges whether the received image compression data is low compression data LCD or high compression data HCD, to thereby output the low compression data LCD and the high compression data HCD. The adder 110 receives the low compression data LCD of the first judgment unit 100 and adds a subtraction constant DT to the received low compression data LCD and transforms the received low compression data into first quantization data QN1. The second judgment unit 120 receives the high compression data of the first judgment unit 100 and judges whether the received high compression data is first compression data C1 or second compression data C2, to thereby output the first and second compression data C1 and C2. The first decoder 130 receives the first compression data C1 of the second judgment unit 120 and outputs zero quantization coefficients ZO each having a zero value. The second decoder 140 receives the second compression data C2 of the second judgment unit 120 and outputs second quantization data QN2 according to a coding rule with reference to the coding rule where quantization coefficients are established depending upon compression codes. The inverse quantizer 150 receives the first quantization data QN1, the zero quantization data ZO and the second quantization data QN2, inversely quantizes the first quantization data QN1 to then output first wavelet region image data WD1 having the lowest frequency, inversely quantizes the zero quantization data ZO and the second quantization data QN2 to then second wavelet region image data WD2 having frequencies other than the lowest frequency. The inverse wavelet transformer 160 receives the first wavelet region image data WD1 and the second wavelet region image data WD2 and inversely wavelet-transforms the received first and second wavelet region image data, to thereby output decoded digital image data ID.

The zero quantization data ZO is formed of zero quantization coefficients each having a zero value as many as a corresponding value depending upon the value of the first compression data C1, if the first compression data C1 is zero of a binary number. Otherwise, the zero quantization data ZO is formed of zero quantization coefficients each having a zero value as many as a corresponding value depending upon a value corresponding to an inversely transformed data value obtained by dividing the first compression data C1 from the uppermost bit three bits by three bits, and inversely transforming data composed of remaining bits excluding the first bit among three bits from the uppermost bit to the lowermost bit.

Figure 8:
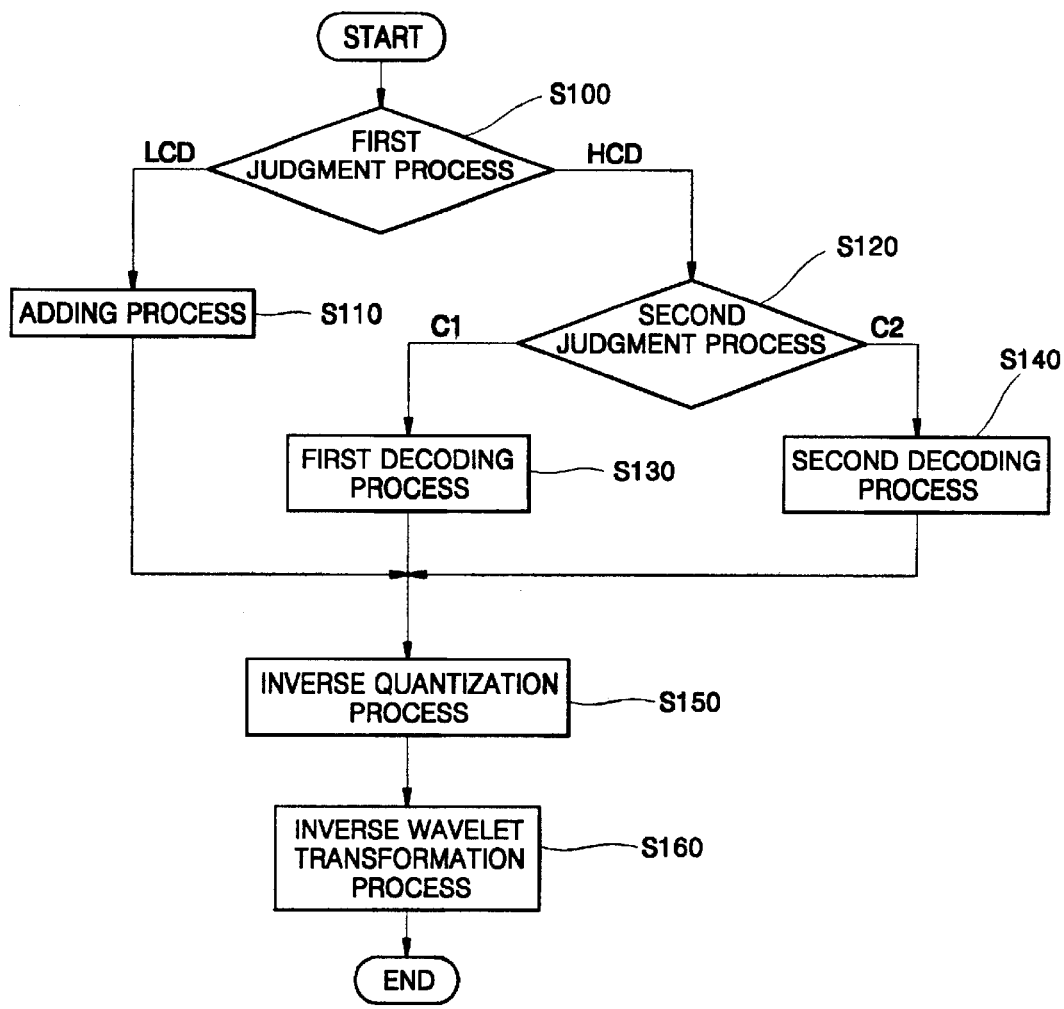
FIG. 8 is a flowchart view illustrating an image decoding method according to the present invention.

FIG. 8 is a flowchart view illustrating an image decoding method according to the present invention.

The image decoding method according the present invention as shown in FIG. 8 includes a first judgment process S100, an adding process S110, a second judgment process S120, a first decoding process S130, a second decoding process S140, an inverse quantization process S150, and an inverse wavelet transformation process S160.

The first judgment process S100 receives image compression data and judges whether the received image compression data is low compression data LCD or high compression data HCD. The adding process S110 adds a subtraction constant DT to the low compression data LCD of the first judgment process S100 and transforms the low compression data into first quantization data. The second judgment process S120 judges whether the high compression data HCD of the first judgment process S100 is first compression data C1 or second compression data C2. The first decoding process S130 receives the first compression data C1 of the second judgment process S120 and outputs zero quantization data each having a zero value. The second decoding process S140 receives the second compression data C2 of the second judgment process S120 and outputs second quantization data according to a coding rule with reference to the coding rule where quantization coefficients are established depending upon compression codes. The inverse quantization process S150 receives the first quantization data, the zero quantization data and the second quantization data, inversely quantizes the first quantization data to then output first wavelet region image data having the lowest frequency, inversely quantizes the zero quantization data and the second quantization data to then second wavelet region image data having frequencies other than the lowest frequency. The inverse wavelet transformation process S160 receives the first wavelet region image data and the second wavelet region image data and inversely wavelet-transforms the received first and second wavelet region image data, to thereby output decoded digital image data.

The operation of the image compression/decoding apparatus and method according to the present invention having the above structure will follow.

The image compression apparatus of FIG. 3 according to the present invention will be described below.

Figure 1:
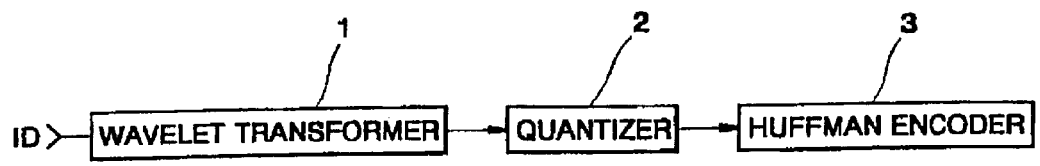
FIG. 1 is a block diagram showing a conventional image compression apparatus.
Figure 2:
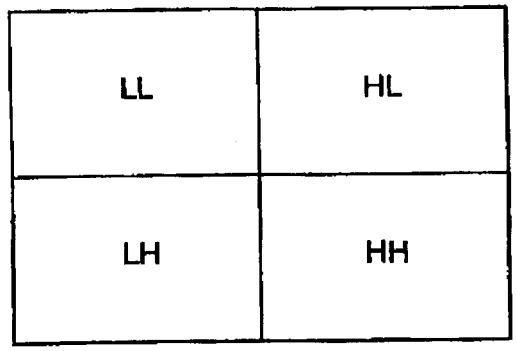
FIG. 2 is a transform state diagram showing the state of an image divided by wavelet transform in a wavelet transformer.

The wavelet transformer 10 receives digital image data (ID) as shown in FIG. 2, wavelet-transforms the digital image data (ID) in at least one step, preferably three steps and divides the digital image data (ID) into a first wavelet region LL having the lowest frequency and a second wavelet region having the other frequency, to thereby output image data WD1 of the first wavelet region and image data WD2 of the second wavelet region. The image data WD1 of the first wavelet region is data closest to original image data. The quantizer 20 receives both the image data WD1 and WD2 of the first and second wavelet regions and respectively quantizes the image data WD1 and WD2 of the first and second wavelet regions to thereby output first quantization data QN1 formed of first quantization coefficients QUAN1 and second quantization data QN2 formed of second quantization coefficients QUAN2, respectively. The first quantization coefficients QUAN1 in the first quantization data QN1 have a variety of values, and most of the second quantization coefficients QUAN2 in the second quantization data QN2 have values ranging between −10 and +10 around zero. The comparator 30 compares the first quantization coefficients QUAN1 of the first quantization data QN1 having the various values, to thereby output the maximum quantization coefficient MAX having the maximum quantization coefficient value and the minimum quantization coefficient MIN having the minimum quantization coefficient value, among the first quantization coefficients QUAN1. The subtracter 40 receives the maximum quantization coefficient MAX and the minimum quantization coefficient MIN output from the comparator 30 and subtracts the latter from the former, to thereby output a subtraction constant DT. The low data compressor 50 receives the first quantization data QN1 and the subtraction constant DT and subtracts the subtraction constant DT from the first quantization coefficients QUAN1 of the first quantization data QN1, to thereby output low compression data LCD obtained by compressing the first quantization data QN1. That is, the low data compressor 50 subtracts the subtraction constant DT from each of the first quantization data QN1 having the various values and compressively codes each of the first quantization coefficients QUAN1 of the first quantization data QN1.

The high data compressor 60 sequentially generates first compression data obtained by coding the number of zero quantization coefficients each having at least one successive zero value which are most frequently distributed among the second quantization coefficients QUAN2 in the second quantization data QN2, and second compression data obtained by coding the second quantization coefficients other than the zero quantization coefficients with reference to a coding rule where compression codes are established according to a respective quantization coefficient, to thereby output high compression data HCD including the first compression data and the second compression data to then be stored in a memory (not shown).

The selector 70 selects one of the low compression data LCD and the high compression data HCD according to the region select signal RS, to thereby output image compression data CD and then be stored in a memory (not shown), in order to distinguish the first wavelet region image compression data from the second wavelet region image compression data and store the image compression data.

The first compression data is obtained by counting the number of zero quantization coefficients having a successive zero value among the second quantization coefficients QUAN2 and coding the successive zero quantization coefficients into the counted result, to thereby enhance a compression rate, since the zero quantization coefficients successively occur with a high probability. For example, in the case that the first compression data is zero quantization coefficients having successive ten zeros among the second quantization coefficients QUAN2, the first compression data can be coded into 1010 of a binary number. Accordingly, the number of bits can be reduced in comparison to the case that every zero quantization coefficient is coded into zero of a binary number.

Also, in the case that the zero quantization coefficients are coded into the counted number, the counted binary number data for distinguishing the zero quantization coefficients is inversely transformed from the uppermost bit to the lowermost bit. The inversely transformed data is divided into two bits by two bits and zero of a binary number is inserted every two bits. Also, zero of a binary number is inserted in front of the uppermost bit of the inversely transformed data, and zero of a binary number is not inserted in the next of the lowermost bit of the inversely transformed data. That is, in the case that the counted number is 10, since 10 is 1010 of a binary number, the inversely transformed result of 1010 from the uppermost bit to the lowermost bit is 0101. If zero of a binary number is inserted every two bits, and inserted in front of the uppermost bit, the ten zero quantization coefficients are coded into 001001.

FIG. 9 shows a coding rule for image compression and image decoding according to the present invention. As shown in FIG. 9, a coding rule contains coding data which is comprised of an upper bit group MSBG including a number of bits and a lower bit group LSBG including a number of bits, depending upon the second quantization coefficients QUAN2. If an absolute value of the second quantization coefficient QUAN2 is one, first coding data of the upper bit group MSBG is 11 of a binary number. As the absolute value of the second quantization coefficient QUAN2 increases, zero of a binary number is inserted between 1 of a binary number and 1 of a binary number in the first coding data. The number into which zero of the binary number is inserted is the number of significant bits which are obtained by subtracting one of a decimal number from the absolute value of the second quantization coefficient QUAN2 and transforming the subtraction result into a binary number. If a second quantization coefficient QUAN2 is +1, the second coding data of the lower bit group LSBG is one of a binary number. If a second quantization coefficient QUAN2 is −1, the third coding data of the lower bit group LSBG is zero of a binary number. If a second quantization coefficient QUAN2 is a positive number and larger than +1, the coding data of the lower bit group LSBG contains bits obtained by transforming a decimal number obtained by {second quantization coefficient−($2^{(number\ of\ significant\ bits-1)}$+1)}*2+1 into a binary number. If a second quantization coefficient QUAN2 is a negative number and smaller than −1, the coding data of the lower bit group LSBG contains bits obtained by transforming a decimal number obtained by {absolute value of second quantization coefficient−($2^{(number\ of\ significant\ bits-1)}$+1)}*2 into a binary number. That is, in the case that the quantization coefficient is +1 or −1, the compression data is coded into 111 and 110, respectively. Concerning the second quantization coefficients QUAN2 excluding +1 and −1, the compression data is coded in the following method.

For example, the first coding data having a quantization coefficient of +6 in the upper bit group MSBG is 10001, in which 000 of a binary number is inserted between 1 of a binary number and 1 of a binary number in the first coding data of 11 in the upper bit group MSBG of +1, since the number of significant bits of the data obtained by subtracting 1 of a decimal number from the absolute value of 6 of the second quantization coefficient QUAN2 and transforming the subtraction result of 5 into a binary number is three. Since the first coding data in the lower bit group LSBG contains bits obtained by transforming a decimal number obtained by {second quantization coefficient−($2^{(number\ of\ significant\ bits-1)}$+1)}*2+1 into a binary number, {6−($2^{(3-1)}$+1)}*2+1 is equal to three and the binary number of three is 011. Thus, the first coding data in the lower bit group LSBG is 011. As a result, the first coding data of the quantization coefficient of +6 is 10001011.

In the same manner, the first coding data having a quantization coefficient of −6 in the upper bit group MSBG is 10001, in which 000 of a binary number is inserted between 1 of a binary number and 1 of a binary number in the first coding data of 11 in the upper bit group MSBG of −1, since the number of significant bits of the data obtained by subtracting 1 of a decimal number from the absolute value of 6 of the second quantization coefficient QUAN2 and transforming the subtraction result of 5 into a binary number is three. Since the first coding data in the lower bit group LSBG contains bits obtained by transforming a decimal number obtained by {second quantization coefficient−($2^{(number\ of\ significant\ bits-1)}$+1)}*2 into a binary number, {6−($2^{(3-1)}$+1)}*2 is equal to two and the binary number of two is 010. Thus, the first coding data in the lower bit group LSBG is 010. As a result, the first coding data of the quantization coefficients of −6 is 10001010.

In the same way, the second quantization coefficients ranging from ±1 to ±255 can be coded.

The operation of the image compression method according to a first embodiment of the present invention of FIG. 4 will follow.

The wavelet transformation process S10 receives digital image data, wavelet-transforms the digital image data in at least one step, and divides the digital image data into first wavelet region image data having the lowest frequency and second wavelet region image data having the other frequency. The quantization process S20 quantizes the image data of the first wavelet region and the image data of the second wavelet region to thereby generate first quantization data formed of first quantization coefficients and second quantization data formed of second quantization coefficients, respectively. The quantization data judgement process S30 receives the first and second quantization data generated in the quantization process S20, and judges whether currently received quantization data is the first quantization data or the second quantization data. The comparison process S40 compares the first quantization coefficients of the first quantization data, if it is judged that the currently received quantization data is the first quantization data in the quantization data judgement process S30, to thereby output the maximum quantization coefficient having the maximum quantization coefficient value and the minimum quantization coefficient having the minimum quantization coefficient value, among the first quantization coefficients. The subtraction process S50 subtracts the minimum quantization coefficient from the maximum quantization coefficient, which are generated in the comparison process S40, to thereby output a subtraction constant. The low data compression process S60 subtracts the subtraction constant generated in the subtraction process S50 from the first quantization coefficients of the first quantization data, to thereby output low compression data obtained by compressing the first quantization data. The high data compression process S70 codes the number of zero quantization coefficients each having at least one successive zero value among the sequentially input second quantization coefficients, if the received quantization data is the second quantization data in the quantization data judgment process S30, and codes the second quantization coefficients other than the zero quantization coefficients according to a coding rule with reference to the coding rule where compression codes are established according to a respective quantization coefficient, to thereby output high compression data.

Also, a compression data selection process S80 selects one of the low compression data and the high compression data according to a region select signal for distinguishing the first wavelet region and the second wavelet region and stores the selected compression data in a memory (not shown).

The zero coefficient judgment step S71 in the high data compression process S70 judges whether sequentially input second quantization coefficients are zero quantization coefficients each having a zero value. The counting step S73 counts the number of the zero quantization coefficients if the second quantization coefficients are zero quantization coefficients in the zero coefficient judgment step S71. The first compression step S75 codes the counted result of the counting step S73 into data of a binary number to then generate first compression data, and reset the counted number of the counting step S73. The second compression step S77 codes the second quantization coefficients according to a coding rule with reference to the coding rule where compression codes are established according to a respective quantization coefficient if the second quantization coefficients are not the zero quantization coefficients in the zero coefficient judgment step S71.

Also, in the case of the first compression data in the first compression step S75, the counted binary number data of the counting step S73 is inversely transformed from the uppermost bit to the lowermost bit. The inversely transformed data is divided into two bits by two bits and zero of a binary number is inserted every two bits. Also, zero of a binary number is inserted in front of the uppermost bit of the inversely transformed data, and zero of a binary number is not inserted in the next of the lowermost bit of the inversely transformed data. Also, in the high data compression step S70, the zero quantization coefficients may be coded into zero of a binary number.

The coding of the second quantization coefficients according to the coding rule is same as the above-described method.

Thus, the image compression apparatus and method shown in FIGS. 3 and 4 according to the present invention divides first quantization coefficient data having the lowest frequency region and second quantization coefficient data other than the lowest frequency region by wavelet transformation, and compresses the divided first quantization coefficient data in a different method with respect to each other, to thereby efficiently compress image data, and minimize a memory capacity for storing the compressed data. Also, since the quantization coefficient data is coded according to a coding rule and the Huffman tree need not be embodied, a calculation amount can be minimized and a circuit for embodying the image compression apparatus can be simplified.

The operation of the image compression method according to a second embodiment of the present invention as shown in FIG. 5 is same as that of the first embodiment of FIG. 4 according to the present invention. The image compression method of FIG. 5 quantizes first and second wavelet region image data in the quantization process S20a, respectively, and then judges whether there is a quantization coefficient having a zero value with respect to all quantization coefficients. Accordingly, the image compression method of FIG. 5 proceeds a zero coefficient judgement process S71a, a counting process S73a, a first compression process S75a, and a second compression process S77a, in the same manner as those of the image compression method according to the first embodiment of FIG. 4.

Thus, the image compression method according to a second embodiment of the present invention as shown in FIG. 5 can increase a compression rate in comparison with the case of FIG. 4, in the case that there are many quantization coefficients having a zero value among the quantization coefficients obtained by quantizing the image data of the first wavelet region.

The operation of the image compression method according to a third embodiment of the present invention as shown in FIG. 6 is same as that of the first embodiment of FIG. 4 according to the present invention. The image compression method of FIG. 6 quantizes first and second wavelet region image data in the quantization process S20a, respectively, and then proceeds a comparison process S30a, a subtraction process S40a, and a compression process S50a, with respect to all the quantization coefficients in the same manner as those of the image compression method according to the first embodiment of FIG. 4.

An image decoding apparatus of FIG. 7 according to the present invention and an image decoding method of FIG. 8 according to the present invention are reverse to those of the image compression apparatus and method of FIGS. 3 and 4, respectively.

The operation of the image decoding apparatus according the present invention as shown in FIG. 7 will follow.

The first judgment unit 100 receives image compression data and judges whether the received image compression data is low compression data LCD or high compression data HCD, to thereby output the low compression data LCD and the high compression data HCD. The adder 110 receives the low compression data LCD of the first judgment unit 100 and adds a subtraction constant DT to the received low compression data LCD and transforms the received low compression data into first quantization data QN1. The second judgment unit 120 receives the high compression data HCD of the first judgment unit 100 and judges whether the received high compression data is first compression data C1 or second compression data C2, to thereby output the first and second compression data C1 and C2. The first decoder 130 receives the first compression data C1 of the second judgment unit 120 and outputs zero quantization coefficients ZO each having a zero value. The second decoder 140 receives the second compression data C2 of the second judgment unit 120 and outputs second quantization data QN2 according to a coding rule with reference to the coding rule where quantization coefficients are established depending upon compression codes. The inverse quantizer 150 receives the first quantization data QN1, the zero quantization data ZO and the second quantization data QN2, inversely quantizes the first quantization data QN1 to then output first wavelet region image data WD1 having the lowest frequency, inversely quantizes the zero quantization data ZO and the second quantization data QN2 to then second wavelet region image data WD2 having frequencies other than the lowest frequency. The inverse wavelet transformer 160 receives the first wavelet region image data WD1 and the second wavelet region image data WD2 and inversely wavelet-transforms the received first and second wavelet region image data, to thereby output decoded digital image data ID.

The zero quantization data ZO is formed of zero quantization coefficients each having a zero value as many as a corresponding value depending upon the value of the first compression data C1, if the first compression data C1 is zero of a binary number. That is, if the value of the first compression data C1 is 1010, it can be seen that ten quantization coefficients are successive since 1010 of a binary number is 10 in decimal number.

Otherwise, the zero quantization data ZO is formed of zero quantization coefficients each having a zero value as many as a corresponding value depending upon a value corresponding to an inversely transformed data value obtained by dividing the first compression data C1 from the uppermost bit three bits by three bits, and inversely transforming data composed of remaining bits excluding the first bit among three bits from the uppermost bit to the lowermost bit.

The operation of the image decoding method of FIG. 8 will follow.

The first judgment process S100 judges whether image compression data is low compression data LCD or high compression data HCD. The adding process S110 adds a subtraction constant DT to the low compression data LCD of the first judgment process S100 and transforms the low compression data into first quantization data. The second judgment process S120 judges whether the high compression data HCD of the first judgment process S100 is first compression data C1 or second compression data C2. The first decoding process S130 receives the first compression data C1 of the second judgment process S120 and outputs zero quantization data each having a zero value. The second decoding process S140 receives the second compression data C2 of the second judgment process S120 and outputs second quantization data according to a coding rule with reference to the coding rule where quantization coefficients are established depending upon compression codes. The inverse quantization process S150 receives the first quantization data, the zero quantization data and the second quantization data, inversely quantizes the first quantization data to then output first wavelet region image data having the lowest frequency, inversely quantizes the zero quantization data and the second quantization data to then second wavelet region image data having frequencies other than the lowest frequency. The inverse wavelet transformation process S160 receives the first wavelet region image data and the second wavelet region image data and inversely wavelet-transforms the received first and second wavelet region image data, to thereby output decoded digital image data.

Thus, the image compression/decoding apparatus and method according to the present invention divides first quantization coefficient data having the lowest frequency region and second quantization coefficient data other than the lowest frequency region by wavelet transformation, and compresses the divided first quantization coefficient data in a different method with respect to each other, to thereby efficiently compress image data, and minimize a memory capacity for storing the compressed data. Also, since the quantization coefficient data is coded according to a coding rule and the Huffman tree need not be embodied, a calculation amount can be minimized and a circuit for embodying the image compression apparatus can be simplified.

As described above, the present invention has been described with respect to the particularly preferred embodiments thereof. However, the present invention is not limited to the above embodiments, but various modifications and corrections can be possible by one who has an ordinary skill in the art without departing off the spirit of the present invention and within the technical scope of the appended claims.

What is claimed is:

1. An image compression apparatus comprising:
   a wavelet transformer which receives digital image data, wavelet-transforms the digital image data in at least one step, and divides the digital image data into a first wavelet region having the lowest frequency and a second wavelet region having the other frequency, to thereby output image data of the first wavelet region and image data of the second wavelet region;
   a quantizer which receives both the image data of the first and second wavelet regions and respectively quantizes the image data of the first and second wavelet regions to thereby output first quantization data formed of first quantization coefficients and second quantization data formed of second quantization coefficients, respectively;
   a comparator which receives the first quantization data and compares the first quantization coefficients of the first quantization data, to thereby output the maximum quantization coefficient having the maximum quantization coefficient value and the minimum quantization coefficient having the minimum quantization coefficient value, among the first quantization coefficients;
   a subtracter which receives the maximum quantization coefficient and the minimum quantization coefficient output from the comparator and subtracts the latter from the former, to thereby output a subtraction constant;
   a low data compressor which receives the first quantization data and the subtraction constant and subtracts the subtraction constant from the first quantization coefficients of the first quantization data, to thereby output low compression data obtained by compressing the first quantization data; and
   a high data compressor which sequentially receives the second quantization coefficients of the second quantization data and sequentially generates first compression data obtained by coding the number of zero quantization coefficients each having at least one successive zero value among the second quantization coefficients, and second compression data obtained by coding the second quantization coefficients other than the zero quantization coefficients according to a coding rule with reference to the coding rule where compression codes are established according to a respective quantization coefficient, to thereby output high compression data.

2. The image data compression apparatus of claim 1, wherein the first compression data is obtained by counting the number of zero quantization coefficients having at least one successive zero value among the second quantization coefficients and coding the successive zero quantization coefficients into the counted result.

3. The image data compression apparatus of claim 3, wherein the first compression data is inversely transformed from the uppermost bit of the counted binary number data to the lowermost bit thereof,
   wherein the inversely transformed data is divided into two bits by two bits and then zero of a binary number is inserted every two bits,
   wherein zero of a binary number is inserted in front of the uppermost bit of the inversely transformed data, and
   wherein zero of a binary number is not inserted in the next of the lowermost bit of the inversely transformed data.

4. The image data compression apparatus of claim 1, wherein the coding rule comprises coding data which is comprised of an upper bit group including a number of bits and a lower bit group including a number of bits, depending upon the second quantization coefficients,
   wherein if an absolute value of the second quantization coefficient is one, first coding data of the upper bit group is 11 of a binary number,
   wherein as the absolute value of the second quantization coefficient QUAN2 increases, zero of a binary number is inserted between 1 of a binary number and 1 of a binary number in the first coding data,
   wherein the number into which zero of the binary number is inserted is the number of significant bits which are obtained by subtracting one of a decimal number from the absolute value of the second quantization coefficient and transforming the subtraction result into a binary number,
   wherein if a second quantization coefficient is +1, the second coding data of the lower bit group is one of a binary number,
   wherein if a second quantization coefficient is −1, the third coding data of the lower bit group is zero of a binary number,
   wherein if a quantization coefficient is a positive number and larger than +1, the coding data of the lower bit group contains bits obtained by transforming a decimal number obtained by {second quantization coefficient−$(2^{(number\ of\ significant\ bits}-1)+1)\}*2+1$ into a binary number, and wherein if a quantization coefficient is a negative number and smaller than −1, the coding data of the lower bit group contains bits obtained by transforming a decimal number obtained by {absolute value of second quantization coefficient−($2^{(number\ of\ significant\ bits-1)}$+1)}*2 into a binary number.

5. An image compression method comprising:

a wavelet transformation process which receives digital image data, wavelet-transforms the digital image data in at least one step, and divides the digital image data into a first wavelet region having the lowest frequency and a second wavelet region having the other frequency;

a quantization process which quantizes the image data of the first wavelet region and the image data of the second wavelet region to thereby generate first quantization data formed of first quantization coefficients and second quantization data formed of second quantization coefficients, respectively;

a quantization data judgement process which receives the first and second quantization data generated in the quantization process, and judges whether currently received quantization data is the first quantization data or the second quantization data;

a comparison process which compares the first quantization coefficients of the first quantization data, if it is judged that the currently received quantization data is the first quantization data in the quantization data judgement process, to thereby output the maximum quantization coefficient having the maximum quantization coefficient value and the minimum quantization coefficient having the minimum quantization coefficient value, among the first quantization coefficients;

a subtraction process which subtracts the minimum quantization coefficient from the maximum quantization coefficient, which are generated in the comparison process, to thereby output a subtraction constant;

a low data compression process which subtracts the subtraction constant from the first quantization coefficients of the first quantization data, to thereby output low compression data obtained by compressing the first quantization data; and a high data compression process which codes the number of zero quantization coefficients each having at least one successive zero value among the sequentially input second quantization coefficients, if the received quantization data is the second quantization data in the quantization data judgment process, and codes the second quantization coefficients other than the zero quantization coefficients according to a coding rule with reference to the coding rule where compression codes are established according to a respective quantization coefficient, to thereby output high compression data.

6. The image data compression method of claim 5, further comprising a compression data selection process which receives a region select signal for distinguishing the first wavelet region from the second wavelet region, the low compression data and the high compression data and selects one of the low compression data and the high compression data according to the region select signal.

7. The image data compression method of claim 5, wherein the high data compression process comprises: a zero coefficient judgment step of judging whether sequentially input second quantization coefficients are zero quantization coefficients each having a zero value; a counting step of counting the number of the zero quantization coefficients if the second quantization coefficients are zero quantization coefficients in the zero coefficient judgment step; a first compression step of coding the counted result of the counting step into data of a binary number to then generate first compression data, and reset the counted number of the counting step; and a second compression step of coding the second quantization coefficients according to a coding rule with reference to the coding rule where compression codes are established according to a respective quantization coefficient if the second quantization coefficients are not the zero quantization coefficients in the zero coefficient judgment step.

8. The image data compression method of claim 5, wherein coding of the zero quantization coefficients in the high data compression process is performed by coding zero quantization coefficients into zero of a binary number.

9. The image data compression method of claim 7 wherein the binary number data counted in the counting process in the case of the first compression data of the first compression process is inversely transformed from the uppermost bit to the lowermost bit, wherein the inversely transformed data is divided into two bits by two bits, and then zero of a binary number is inserted every two bits, wherein zero of a binary number is inserted in front of the uppermost bit of the inversely transformed data, and wherein zero of a binary number is not inserted in the next of the lowermost bit of the inversely transformed data.

10. The image data compression method of claim 5, wherein the coding rule comprises coding data which is comprised of an upper bit group including a number of bits and a lower bit group including a number of bits, depending upon the second quantization coefficients, wherein if an absolute value of the second quantization coefficient is one, first coding data of the upper bit group is 11 of a binary number, wherein as the absolute value of the second quantization coefficient QUAN2 increases, zero of a binary number is inserted between 1 of a binary number and 1 of a binary number in the first coding data, wherein the number into which zero of the binary number is inserted is the number of significant bits which are obtained by subtracting one of a decimal number from the absolute value of the second quantization coefficient and transforming the subtraction result into a binary number, wherein if a second quantization coefficient is +1, the second coding data of the lower bit group is one of a binary number, wherein if a second quantization coefficient is −1, the third coding data of the lower bit group is zero of a binary number, wherein if a quantization coefficient is a positive number and larger than +1, the coding data of the lower bit group contains bits obtained by transforming a decimal number obtained by {second quantization coefficient−($2^{(number\ of\ significant\ bits-1)}$+1)}*2+1 into a binary number, and wherein if a quantization coefficient is a negative number and smaller than −1, the coding data of the lower bit group contains bits obtained by transforming a decimal number obtained by {absolute value of second quantization coefficient−($2^{(number\ of\ significant\ bits-1)}$+1)}*2 into a binary number.

11. An image data compression method comprising:
a wavelet transformation process of receiving digital image data, and wavelet-transforming the digital image data in at least one step;
a quantization process of quantizing the wavelet transformed image data to thereby generate quantization data;
a zero coefficient judgement process of judging whether the quantization coefficients of the sequentially input quantization data are zeros;
a counting process of counting the number of the zero quantization coefficients if the quantization coefficients are zeros in the zero coefficient judgment process;
a first compression process of coding the counted result of the counting step into data of a binary number to then generate first compression data, and reset the counted number of the counting process; and
a second compression process of coding the quantization coefficients according to a coding rule with reference to the coding rule where compression codes are established according to a respective quantization coefficient if the quantization coefficients are not zero in the zero coefficient judgment process.

12. The image data compression method of claim 11, wherein the binary number data counted in the counting process in the case of the first compression data of the first compression process is inversely transformed from the uppermost bit to the lowermost bit,
wherein the counted number of the counting process is divided into two bits by two bits,
wherein zero of a binary number is inserted every two bits, and
wherein zero of a binary number is not inserted in the next of the lowermost two bits of the counted number.

13. The image data compression method of claim 11, wherein the coding rule comprises coding data which is comprised of an upper bit group including a number of bits and a lower bit group including a number of bits, depending upon the second quantization coefficients,
wherein if an absolute value of the second quantization coefficient is one, first coding data of the upper bit group is 11 of a binary number,
wherein as the absolute value of the second quantization coefficient QUAN2 increases, zero of a binary number is inserted between 1 of a binary number and 1 of a binary number in the first coding data,
wherein the number into which zero of the binary number is inserted is the number of significant bits which are obtained by subtracting one of a decimal number from the absolute value of the second quantization coefficient and transforming the subtraction result into a binary number,
wherein if a second quantization coefficient is +1, the second coding data of the lower bit group is one of a binary number,
wherein if a second quantization coefficient is −1, the third coding data of the lower bit group is zero of a binary number,
wherein if a quantization coefficient is a positive number and larger than +1, the coding data of the lower bit group contains bits obtained by transforming a decimal number obtained by {second quantization coefficient−$(2^{(number\ of\ significant\ bits-1)}+1)$}*2+1 into a binary number, and
wherein if a quantization coefficient is a negative number and smaller than −1, the coding data of the lower bit group contains bits obtained by transforming a decimal number obtained by {absolute value of second quantization coefficient−$(2^{(number\ of\ significant\ bits-1)}+1)$}*2 into a binary number.

14. An image data compression method comprising:
a wavelet transformation process of receiving digital image data, and wavelet-transforming the digital image data in at least one step;
a quantization process of quantizing the wavelet transformed image data to thereby generate quantization data;
a comparison process of generating the maximum quantization coefficient having the largest quantization coefficient value and the minimum quantization coefficient having the smallest quantization coefficient value, among the quantization data;
a subtraction process of subtracting the minimum quantization coefficient from the maximum quantization coefficient generated in the comparison process, to thereby generate a subtraction constant; and
a compression process of subtracting the subtraction constant generated in the subtraction process from each of the quantization coefficients in the quantization data, to thereby compress the quantization data.

15. An image decoding apparatus comprising:
a first judgment unit which receives image compression data and judges whether the received image compression data is low compression data or high compression data, to thereby output the low compression data and the high compression data;
an adder which receives the low compression data of the first judgment unit and adds a subtraction constant to the received low compression data and transforms the received low compression data into first quantization data;
a second judgment unit which receives the high compression data of the first judgment unit and judges whether the received high compression data is first compression data or second compression data, to thereby output the first and second compression data;
a first decoder which receives the first compression data of the second judgment unit and outputs zero quantization coefficients each having a zero value;
a second decoder which receives the second compression data of the second judgment unit and outputs second quantization data according to a coding rule with reference to the coding rule where quantization coefficients are established depending upon compression codes;
an inverse quantizer which receives the first quantization data, the zero quantization data and the second quantization data, inversely quantizes the first quantization data to then output first wavelet region image data having the lowest frequency, inversely quantizes the zero quantization data and the second quantization data to then second wavelet region image data having frequencies other than the lowest frequency; and
an inverse wavelet transformer which receives the first wavelet region image data and the second wavelet region image data and inversely wavelet-transforms the received first and second wavelet region image data, to thereby output decoded digital image data.

16. The image decoding apparatus of claim 15, wherein the zero quantization data is formed of zero quantization coefficients each having a zero value as many as a corresponding value depending upon the value of the first compression data.

17. The image decoding apparatus of claim 15, wherein the zero quantization data is formed of zero quantization coefficients each having a zero value as many as a corresponding value depending upon a value corresponding to an inversely transformed data value obtained by dividing the first compression data from the uppermost bit three bits by three bits, and inversely transforming data composed of remaining bits excluding the first bit among three bits from the uppermost bit to the lowermost bit.

18. An image decoding method comprising:

a first judgment process of receiving image compression data and judges whether the received image compression data is low compression data or high compression data;

an adding process of adding a subtraction constant to the low compression data of the first judgment process and transforming the low compression data into first quantization data;

a second judgment process of judging whether the high compression data of the first judgment process is first compression data or second compression data;

a first decoding process of receiving the first compression data of the second judgment process and outputting zero quantization data each having a zero value;

a second decoding process of receiving the second compression data of the second judgment process and outputting second quantization data according to a coding rule with reference to the coding rule where quantization coefficients are established depending upon compression codes;

an inverse quantization process of receiving the first quantization data, the zero quantization data and the second quantization data, inversely quantizing the first quantization data to then output first wavelet region image data having the lowest frequency, inversely quantizing the zero quantization data and the second quantization data to then second wavelet region image data having frequencies other than the lowest frequency; and an inverse wavelet transformation process of receiving the first wavelet region image data and the second wavelet region image data and inversely wavelet-transforming the received first and second wavelet region image data, to thereby output decoded digital image data.

* * * * *